United States Patent [19]

Rees et al.

[11] 4,243,362
[45] Jan. 6, 1981

[54] COMPOSITE MOLDING APPARATUS FOR ARTICLES FROM TWO MATERIALS HAVING A ROTARY MOLD BLOCK WHICH INCLUDES PINS FOR PROVIDING CORE AREAS

[75] Inventors: Herbert Rees, Willowdale; James D. Nevrela, Bramalea, both of Canada

[73] Assignee: Globe-Union Inc., Milwaukee, Wis.

[21] Appl. No.: 45,540

[22] Filed: Jun. 4, 1979

[51] Int. Cl.³ .......................... B29C 1/14; B29F 1/00
[52] U.S. Cl. ................................ 425/130; 264/273; 425/134; 425/183; 425/556
[58] Field of Search ............... 425/130, 134, 183, 556; 264/273

[56] References Cited

U.S. PATENT DOCUMENTS

| 3,158,109 | 11/1964 | Stott | 425/134 |
| 3,224,043 | 12/1965 | Lameris et al. | 425/134 |
| 3,309,739 | 3/1967 | Trueblood | 425/183 |
| 3,408,691 | 11/1968 | Ruekberg | 425/155 |
| 3,702,750 | 11/1972 | Veneria | 425/257 |
| 3,726,625 | 4/1973 | Rees | 425/556 |
| 3,832,110 | 8/1974 | Hehl | 425/130 |
| 3,947,176 | 3/1976 | Rainville | 425/130 |
| 4,118,553 | 10/1978 | Buckenthal et al. | 264/219 |

Primary Examiner—Maurice J. Welsh
Attorney, Agent, or Firm—Joseph J. Jochman, Jr.; John Phillip Ryan

[57] ABSTRACT

An apparatus for injection molding composite articles from two materials includes a rotary mold block carrying a two material mold half between a first material mold half and a second material mold half; the rotary block providing, in sequence, a first material mold cavity and a composite material mold cavity in which latter cavity the second material is injected over, and preferably in positive engagement with, the first material. Core pins are carried in the rotary block which includes means to index the pins for providing core areas in the first material and subsequently retracting the pins so that the second material can flow into the core areas for positive engagement of the composite molded materials.

20 Claims, 10 Drawing Figures

COMPOSITE MOLDING APPARATUS FOR ARTICLES FROM TWO MATERIALS HAVING A ROTARY MOLD BLOCK WHICH INCLUDES PINS FOR PROVIDING CORE AREAS

BACKGROUND OF THE INVENTION

The present invention relates to apparatus for molding composite articles from two flowable materials and, more particularly, pertains to an injection molding machine for forming a composite lead and plastic article.

Injection molding machines for forming composite articles of two or more materials are known in the art. Most of the prior art machines are of the multiple mold-multiple station type wherein a first material is injected into a first mold cavity, the first material is moved to a second station where the second material is injected into contact with the first, and the composite article is then moved to another station for removal, usually by positive ejection. Other treatment steps, such as blow molding, may be interposed at stations between the injection and ejection stations. The mold cavities are generally formed and opened after molding by relative reciprocal movement between two mold halves, one of which may be subsequently translated with the first injected material to form a second mold cavity with another mold half, all in a manner well known in the art. Translation of a first molded piece within or on one of its mold halves to a subsequent molding or other station is commonly accomplished by rotation about an axis either perpendicular or parallel to the face of one relatively fixed mold half. Further, it is known to incorporate core pins in the various mold cavities to block the entry of one injected material, which pins are removed at a subsequent station (and replaced with a second set of core pins) to allow another material to be injected into the first core areas to form a composite article. Similar pins are also used to eject finished articles from the molds.

U.S. Pat. Nos. 3,702,750 and 3,832,110 show basically similar two-material article injection molding machines having a pair of mold-carrying platens mounted for relative reciprocal movement and sequential rotary movement to provide two molding stations and an ejection station or position. One of the platens includes two separate sets of fixed core pins which are adapted to be sequentially inserted into first and second mold cavities for formation of a composite article. In U.S. Pat. No. 3,702,750, in addition to the two sets of core pins, a third set of pins is provided for ejecting the composite article. Relative rotation between the platens is provided on an axis perpendicular to the faces of the platens.

U.S. Pat. No. 3,408,691 discloses an injection and blow molding machine in which a rotary mold block is disposed between the mold carrying faces of two relatively reciprocable and opposed platens. The rotary block has an axis of rotation parallel to the mold faces on the platens and is adapted to carry a molded piece from the injection station on one platen to the blow molding station on the other platen. The finished piece is ejected at an intermediate position as the block rotates back to the injection station. The apparatus disclosed in this patent is adapted to form only a one-material article.

In U.S. Pat. No. 3,224,043 a similar machine is disclosed, but which is particularly adapted to form a composite article from two separately injected materials. The intermediate rotary block carries a series of identical mold halves which are adapted to be sequentially carried with a partially formed part from a first injection station on one of the relatively reciprocable platens to the second injection station, diametrically opposite the first on the other platen. The composite parts formed with this apparatus are of a relatively simple configuration and no particular means is disclosed for providing cored regions in the first injected material so that the subsequently injected second material will form an interlocked composite.

U.S. Pat. No. 3,947,176 shows a combined two material injection molding and blow molding apparatus utilizing a rotating center block to transfer the molded articles between stations. Again, however, the composite injection molded article is of simple configuration comprising two layers of plastic injected over a fixed core rod on the rotating block in sequence in stationary split molds.

U.S. Pat. No. 4,118,553 discloses a composite battery grid and method of making such a grid. The composite grid disclosed therein is formed from plastic and a conductive metal, the latter preferably comprising lead. One embodiment of the composite battery grid, shown in this patent, provides for its formation by a method in which the lead portion is molded first with cored areas to subsequently allow the plastic material to be injected over the lead and into the cored areas to provide a positive interlocking of the two materials. In accordance with the disclosed method, one half of the mold used to form a lead-receiving mold cavity is provided with core pins which are extendable into the cavity to prevent the receipt of lead into the cored areas of the lead cavity. The core pins are retractable and the mold half with the retracted pins is subsequently movable along with the molded lead part into engagement with a plastic-receiving mold half to form a composite material mold cavity. Plastic material injected into this cavity fills the plastic-receiving half as well as the cored areas of the lead half vacated by the retracted core pins, resulting in a composite interlocked lead and plastic construction.

Multiple mold-multiple station injection molding apparatus of the prior art, typified by the above identified machine patents, have been found unsuitable to provide composite articles of the construction disclosed in U.S. Pat. No. 4,118,553.

Those composite molding machines in which one of the platens rotates with respect to the other about an axis perpendicular to the mold faces (e.g. U.S. Pat. Nos. 3,702,750 and 3,832,110) require the injection of both materials from the fixed platen end. Where the two materials are very dissimilar and require substantially different injection equipment, injecting both materials from the same side may be extremely difficult or impossible. This is particularly the case where the materials are plastic and metal. In addition, these prior art machines require a separate set of core pins for each injection station and for the part ejection, if pins are used for this latter purpose.

In the other type of prior art composite article molding apparatus, in which a rotary block carries mold halves with the sequentially moldable composite articles between other mold halves on opposed and relatively reciprocable platens (e.g. U.S. Pat. Nos. 3,224,043 and 3,947,176), there is disclosed no means for moving core rods or pins within and relative to the rotary block. In order to form a complex composite article of the type shown in U.S. Pat. No. 4,118,553, it is desirable for a number of reasons that movable core pins be disposed within the mold half receiving the first injected material, which mold half carries the partially molded article to a subsequent injection station to form half of the mold cavity for receipt of the second injected material. First, the core pin ends may be shaped to form undercut recesses in the back face of the first molded material to allow receipt and positive locking of the second molded material. Second, the pins can be retracted and stripped from the first material without dislodging it from the mold half which must carry it to the second material injection station. Third, the retracted pin ends can provide a barrier in the mold cavity for receipt of the second material to prevent its flow beyond the back face of the first molded material. And fourth, the core pins may be utilized to eject the composite article.

SUMMARY OF THE INVENTION

The present invention comprises a composite article molding apparatus in which a rotary block carrying at least one mold half is disposed between two relatively reciprocable platens, each carrying a mold half cooperable with the rotary mold half to sequentially form a composite article of at least two materials; the rotary block carries movable core pin means including means to index the pin means between an extended position within one of the material mold cavities and a retracted position with respect to the composite material mold cavity. The core pin indexing means is operable in response to the relative reciprocal movement of the platens, the rotation of the rotary block, or a combination of rotary and relative reciprocal movements. The pin means extends through the mold half on the rotary block and, in cooperation with the indexing means, provides: (1) core areas including locking recesses in the molded first material; (2) retraction from the molded first material without displacing it from the rotary mold half; (3) a portion of the surface of the composite material mold cavity; and, (4) ejection of the composite article by extension beyond the first material molding position.

In its preferred embodiment, the present invention is especially adapted for molding composite articles of metal and plastic and, in particular, composite lead and plastic battery grids. In this embodiment, one of the relatively reciprocable platens is fixed and a first material injector, preferably a lead die caster, is operatively attached to the fixed platen to inject the first material. The other platen is reciprocable and carries with it a second material injector, preferably a plastic injector, to inject the second material into intimate contact with the first. The rotary block has identical mold halves to simultaneously provide mold cavities with each of the mold halves on the platens; the indexing means being operative to alternate the position of the pin means in each rotating mold half as it rotates from one platen to the other.

DESCRIPTION OF THE PREFERRED EMBODIMENTS

Figure 1:
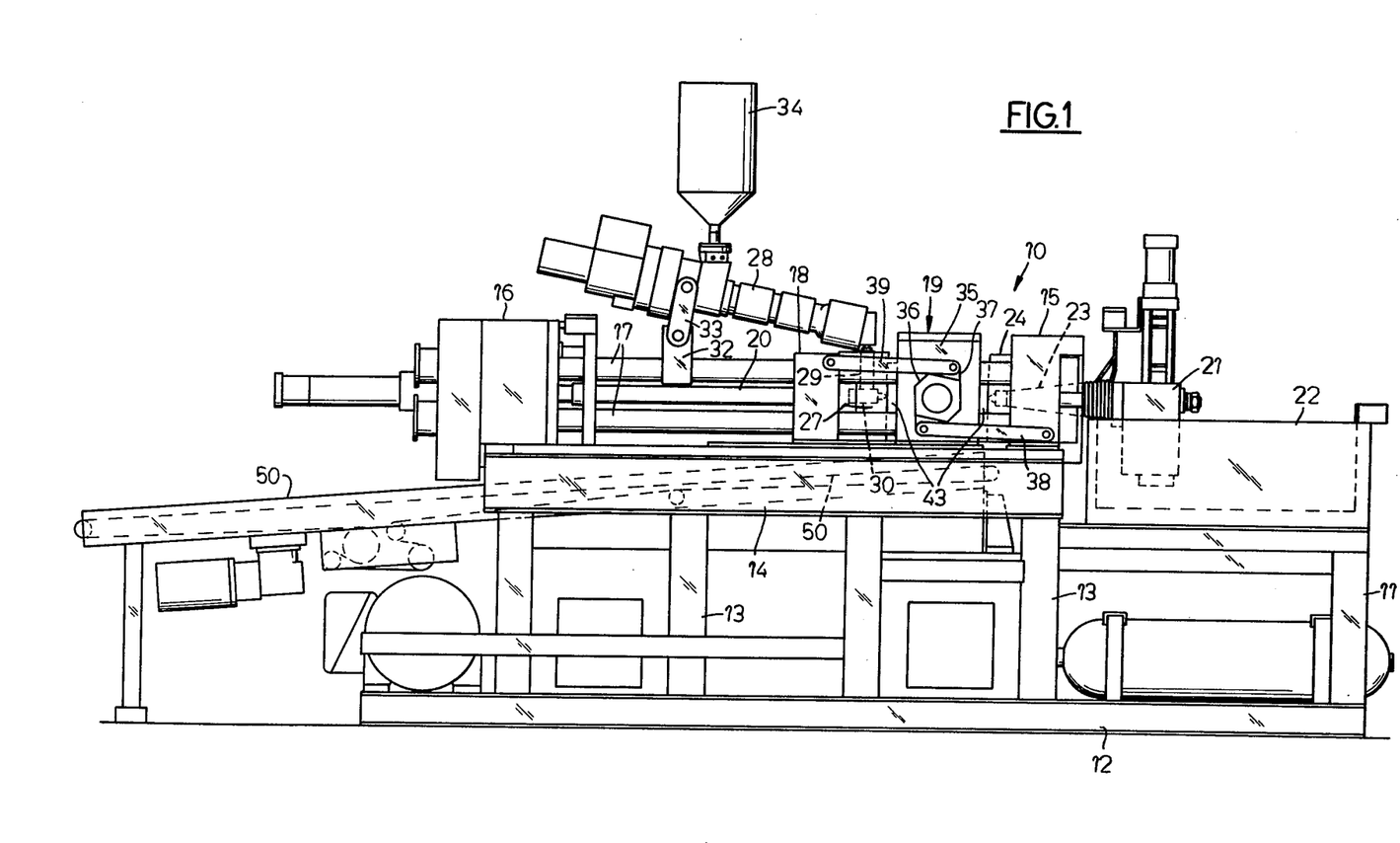
FIG. 1 is a side elevation of the composite article molding apparatus of the present invention, shown in the mold closed position.

In FIG. 1, there is shown an injection molding apparatus 10 mounted on a support structure 11 including a base 12, vertical frame members 13, and a horizontal bed frame member 14. The basic injection molding apparatus is mounted on top of the bed frame member 14 and includes a fixed platen 15 mounted on one end of the bed and a fixed mold clamping mechanism 16 mounted on the opposite end of the bed 14. The clamping mechanism 16 is of the hydraulic type and may be of the construction disclosed in U.S. Pat. No. 4,017,236, however, a mechanical mold clamping mechanism of any of various types well known in the art may also be used.

Figure 2:
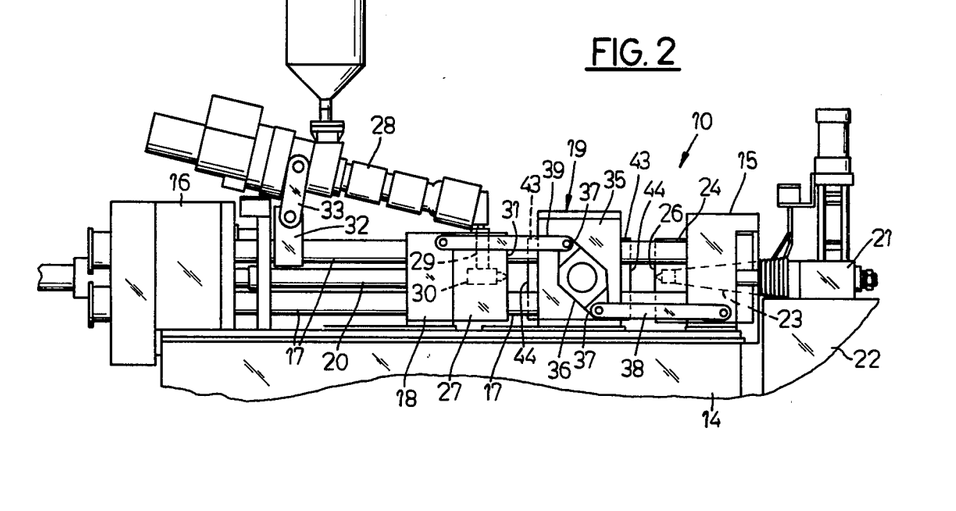
FIG. 2 is a side elevation similar to FIG. 1, but showing the apparatus in the mold open position.

The clamping mechanism 16 is connected to the fixed platen 15 by four horizontal tie rods 17 (only one of each horizontally aligned pair being shown in FIGS. 1 and 2). Mounted on the tie rods 17 for linear reciprocal movement with respect to the clamping mechanism 16 and the fixed platen 15, as well as relative reciprocal movement with respect to each other, are a movable platen 18 and an intermediate mold block 19. Operatively attached at one end to and powered by the clamping mechanism 16 is a reciprocating hydraulic ram 20. Hydraulic ram 20 is attached at its opposite end to the movable platen 18 and through extension and retraction operates to slide the platen 18 forwardly and rearwardly along the tie rods 17 to, respectively, close and open the molds, as will be described in greater detail below.

Figure 3:
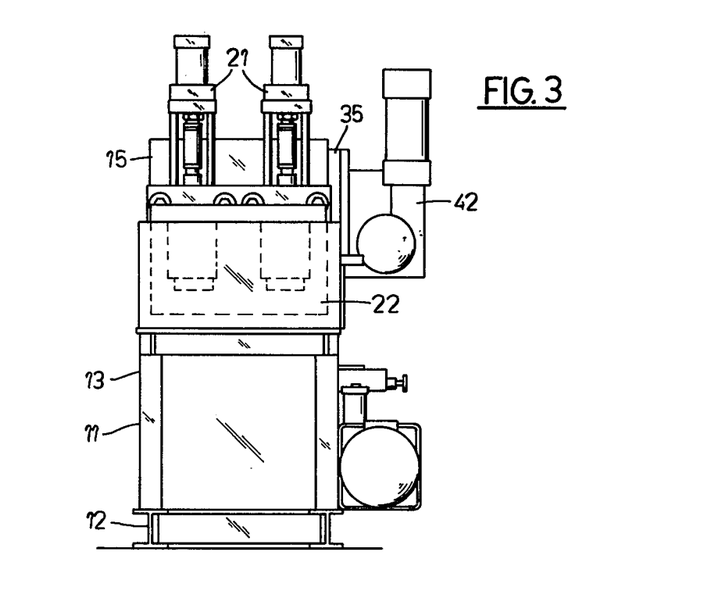
FIG. 3 is an end elevation of the molding apparatus of FIGS. 1 and 2, showing the fixed platen end including a dual injection lead die casting apparatus.

A first material injector 21 is attached to the back of the fixed platen 15 and, in the preferred embodiment, comprises a lead die casting injector. As shown in FIG. 3, the molding apparatus is specifically designed to produce a two-piece composite lead and plastic battery grid and, for this purpose, utilizes a pair of lead injectors 21. Mounted on the support structure 11 beneath the lead injector or injectors 21 is a molten lead container 22 providing a reservoir of molten lead for the injectors, including known means (not shown) for heating and maintaining the lead in a molten state.

It is understood, however, that the first material injector 21 may comprise any type of metal die casting injector or a plastic injector, either of which may be of single or multiple construction.

The first material injector 21 includes a nozzle 23 extending through the fixed platen 15 and into a stationary first material mold half 24 mounted on the front of the platen 15. The nozzle 23 also extends through or substantially through the first material mold half 24 to provide an open passage, typically via a sprue bushing 25 (FIGS. 5 and 6), to the face 26 of mold half 24.

A second material mold half 27 is attached to the front of movable platen 18 for movement therewith in response to the reciprocal movement of hydraulic ram 20. A second material injector 28 is mounted above the tie rods 17 with its injection end attached to a vertical injection channel 29 in the second material mold half 27. Injection channel 29 is in communication with a conventional injection nozzle 30 disposed in the second material mold half and providing a passage for the flow of the second material from injector 28 to the face 31 of second material mold half 27. The second material injector 28 extends rearwardly from its injection end over the upper pair of tie rods 17 and is supported for reciprocal movement with the movable platen 18 and second material mold half 27 by a support bar 32 slidably attached to both of the upper tie rods 17, via an intermediate connecting link 33 pivotally interconnecting the injector 28 and the support bar 32.

In the preferred embodiment, the second material injector 28 is a plastic injector and may be conveniently supplied with an injection moldable plastic material from a hopper 34. However, the second material may be any other moldable material, including metal, and the second material injector 28 may be of any type suitable for injecting such material.

Intermediate mold block 19 is adapted for linear reciprocal movement relative to the fixed and movable platens 15 and 18, and has, as well, internal portions adapted for rotational movement which will be described hereinafter. Intermediate mold block 19 includes a pair of non-rotatable, laterally spaced support blocks 35. Each support block is slidably mounted on one vertically aligned pair of tie rods 17. A centrally mounted crank 36 is rotatably attached to the outside face of each support block 35 and has a pair of crank arms 37 extending in opposite directions from the center. One of a pair of link arms 38 and 39 is pivotally attached to the end of each crank arm 37. The link arms extend in opposite directions with the opposite end of link arm 38 pivotally attached to the fixed platen 15 and the opposite end of link arm 39 pivotally attached to the movable platen 18.

Figure 4:
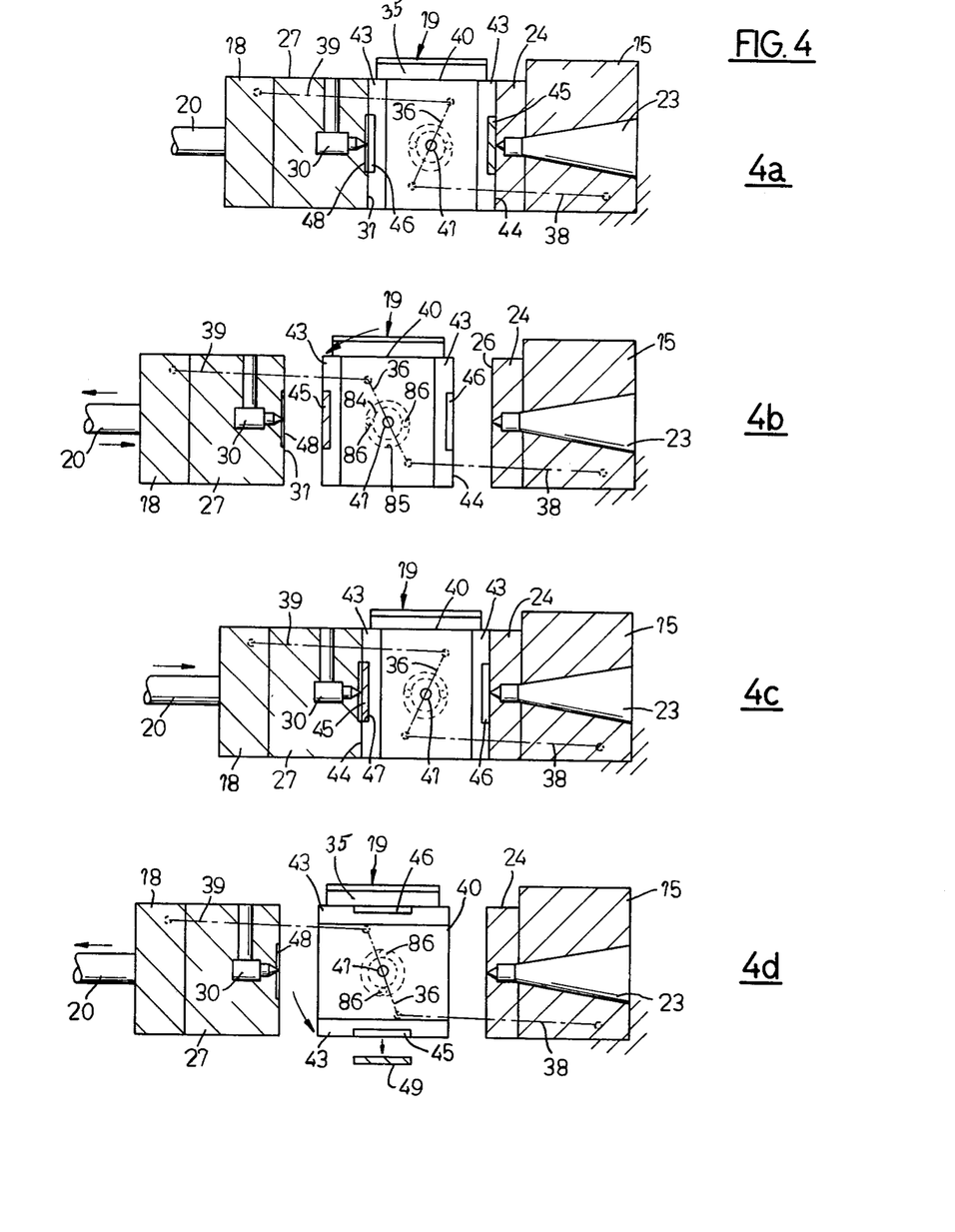
FIGS. 4a–d are schematic side elevation views showing the sequential operation of the molding apparatus of FIGS. 1 and 2.

As is best shown in FIGS. 3 and 4, rotary mold block 40 is disposed between the support blocks 35 of intermediate mold block 19 and is supported for rotation on a shaft 41 journaled at opposite ends in the support blocks. The axis of the shaft 41 is coincident with the axes of cranks 36, but its rotation is independent of the rotation of the cranks and is provided by a separate drive 42 attached to one of the support blocks 35.

Figure 6:
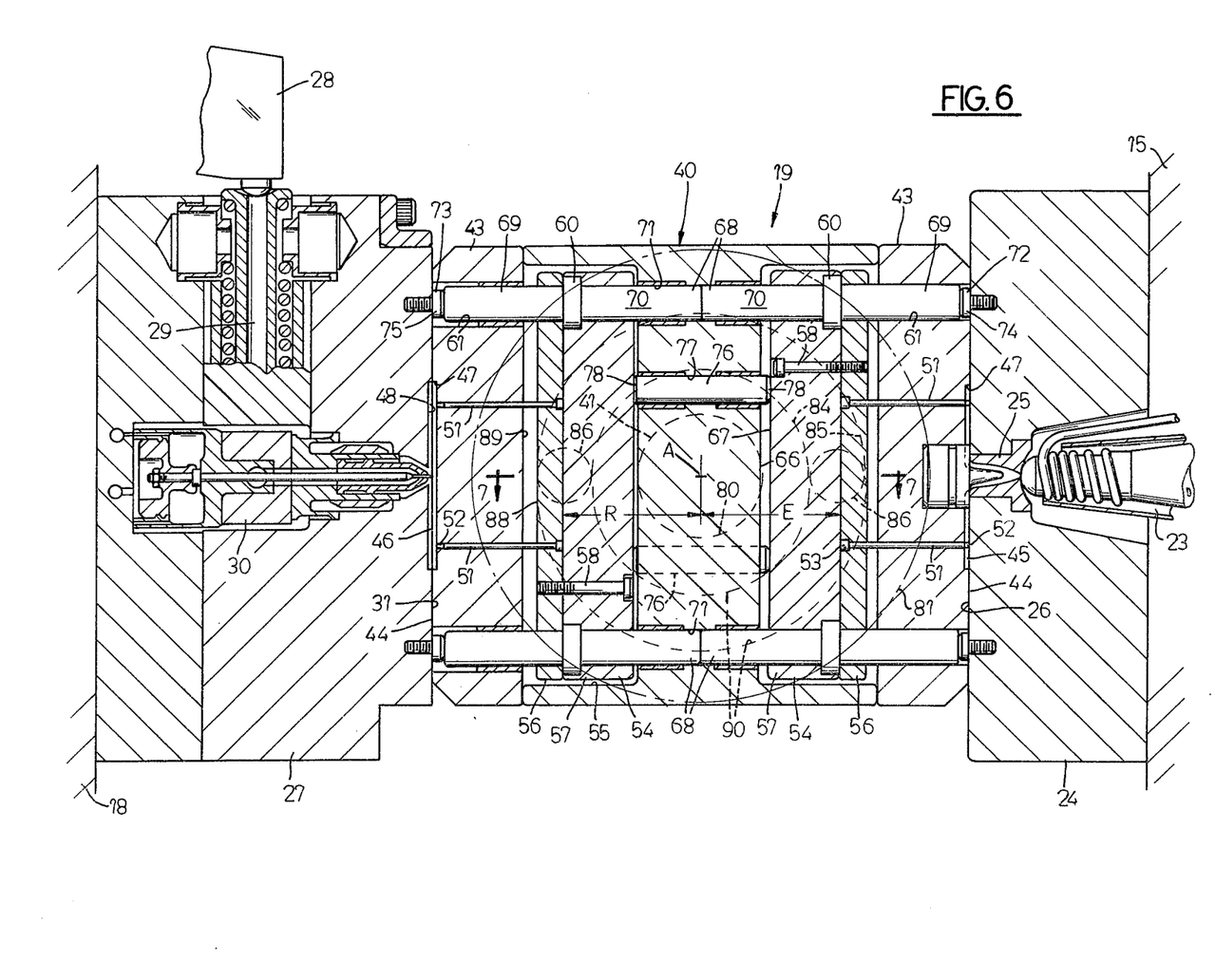
FIG. 6 is a vertical section similar to FIG. 5 showing the preferred embodiment of the core pin indexing mechanism of the present invention.

Referring particularly to FIGS. 1, 2 and 6, showing the invention in its preferred embodiment, a pair of identical two material mold halves 43 is attached to the rotary mold block 40, each on an opposite side thereof. Each mold half 43 may be secured to the block in any convenient manner, such as with pins or bolts, which are not shown in order to preserve drawing clarity. In the mold closed position of FIGS. 1 and 6, the face 44 of the two material mold half 43 on the fixed platen side is in contact with the face 26 of the first material mold half 24 to form a first material-receiving mold cavity 45. The face 44 of the opposite two material mold half 43 is in contact with the face 31 of the second material mold half 27 to form a two material-receiving mold cavity 46. As may best be seen in FIG. 6, the face 26 of the first material mold half 24 is substantially planar and the shape of the first material-receiving mold cavity 45 is formed essentially by a recessed portion 47 in the face 44 of the two material mold half 43. This shape, however, is dictated by the desired configuration of the composite article to be molded and thus the face 26 of the first material mold half 24 might be recessed as well.

In FIGS. 4a–d, the basic sequential operation of the molding apparatus 10 is shown in schematic form. Assuming an initial start-up with both mold cavities 45 and 46 empty and closed in FIG. 4a, a first material (preferably lead) is injected through nozzle 23 into the first material-receiving mold cavity 45. The mold clamping mechanism 16 is then activated to retract hydraulic ram 20 and move the attached movable platen 18 to the left, as indicated by the upper arrow in FIG. 4b. As the platen 18 moves to the left, the link arms 39 connecting it to the crank arms 37 cause the crank 36 to rotate and pull the second material mold half 27 away from contact with the two material mold half 43. By virtue of the rotation of crank 36, the corresponding link arms 38 connecting the oppositely extending crank arms 37 to the fixed platen 15 cause a reacting force tending to push the intermediate mold block 19 away from the platen, causing the other two material mold half 43, now carrying the first injected material (lead) article, to separate from the first material mold half 24. The overall mechanical effect of this linkage results in a linear movement of the movable platen 18 of twice the distance of the movement of the intermediate mold block 19 at the fully open position shown in FIGS. 4b and 2. When the fully open position is reached, the position of hydraulic ram 20 is held and the drive 42, shown in FIG. 3, for the rotary mold block 40 is activated and the rotary mold block is rotated 180° on its shaft 41 in the direction indicated by the arrow encircling shaft 41 in FIG. 4b. This rotation carries the two material mold half 43 holding the first injected material article to a position facing the second material mold half 27, while the yet empty two material mold half 43 on the opposite side of rotary mold block 40 is carried to a position facing the first material mold half 24. Hydraulic ram 20 is next extended to slide movable platen 18 to the right, as indicated by the lower arrow in FIG. 4b. This causes a reversal of the movement of the cranks 36, crank arms 37 and connected link arms 38 and 39, described above, to reclose the molds as shown in FIGS. 4c and 1.

In the mold closed position of FIG. 4c, a second material (preferably plastic) is injected through injection nozzle 30 into the two material-receiving mold cavity 46 and into direct contact with the first injected material article held in the recessed portion 47 in the face 44 of two material mold half 43, resulting in a composite two material article. In accordance with the present invention, the second material is also caused to flow into cored areas provided in the first material in the first material-receiving mold cavity 45, as will be detailed below. However, the face 31 of the second material mold half 27 is provided with a recess 48 to accommodate the major portion of the second injected material. Simultaneously with or immediately preceding or following the injection of the second material into the two material-receiving mold cavity 46, the first material is injected into the first material-receiving mold cavity 45 on the opposite side of the rotary mold block. The mold cavities are reopened, as described above for FIG. 4b, the composite article is held in recessed portion 47 in the two material mold half 43, and the drive 42 is activated to turn rotary mold block 40 in the same direction as indicated by the arrow around shaft 41 in FIG. 4d. However, after rotation of approximately 90° to the position of the rotary mold block 40 shown in FIG. 4d, the composite article 49 is ejected downwardly, preferably under the influence of a positive mechanical ejector mechanism to be described below. Rotary mold block 40 may be stopped briefly for ejection or may continue to rotate the full 180° with ejection occurring during rotation. A conveyor 50 may be located under the molding apparatus 10 to receive the ejected composite articles 49 and convey them away for further processing.

In order to provide a positive interlocking of the first and second injected materials for greater structural integrity in the composite article, mold core pin means including indexing means are disposed in the rotary mold block 40. The core pin means, to be described, are particularly adapted to be used in the composite molding of lead and plastic battery grids of the construction shown in U.S. Pat. No. 4,118,553. However, mold core means of various other configurations may be adapted for use with the molding apparatus of this invention.

Figure 5:
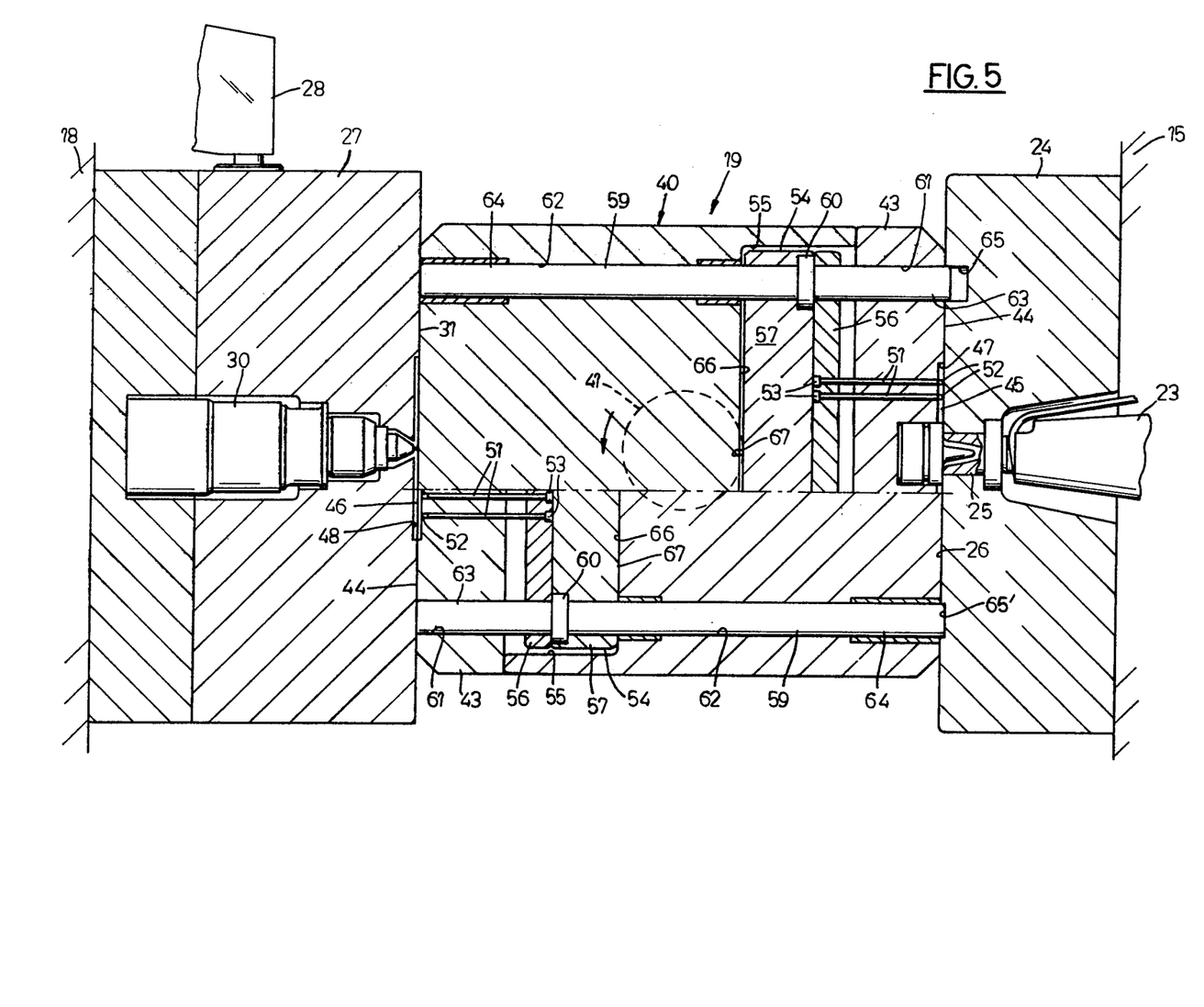
FIG. 5 is an enlarged vertical section taken through the rotary block and reciprocable platens of the apparatus of FIG. 1 showing the core pin indexing means in its most basic embodiment.

FIG. 5 shows the core pin and pin indexing mechanism in its most basic form. In this embodiment, the rotary mold block 40 has only a single two material mold half 43 mounted thereon. The broken horizontal line divides the rotary mold block 40 to show the two material mold half 43 in contact with the first material mold half 24 in the upper portion of FIG. 5 and rotated 180° to contact the second material mold half 27 in the lower portion of the figure.

With the two material mold half 43 in contact with the first material mold half 24 to form the first material-receiving mold cavity 45, a series of core pins 51 is disposed with the pin end portions 52 extending into the mold cavity 45. The core pins 51 are preferably identical and are slidably disposed to extend through the two material mold half 43 perpendicular to its face 44 and the face 26 of the first material mold half 24. Only two core pins are shown, however, a substantially greater number may be used, particularly in molding a composite battery grid. Core pins 51 are secured by their inner ends 53 to a mounting plate 54 disposed in a recessed area 55 in the mold block 40 behind the two material mold half 43. The mounting plate 54 may comprise front and rear plates 56 and 57, respectively, to provide convenient mounting of the pins 51 with their enlarged inner ends 53 disposed in counterbores in the rear face of the front plate 56 to secure them firmly in the mounting plate 54. The front and rear plates 56 and 57 may be attached in any convenient manner, as for example bolts 58 (see FIG. 6).

The mounting plate 54 is disposed for reciprocal movement within the recess 55 on guide pins 59. Although only one guide pin is shown in each of the positions of the rotary mold block 40, for stability and support it is preferred to have an identical guide pin 59 disposed in each of the four corners of the mounting plate. The guide pin 59 is firmly secured to the mounting plate 54, as with an integral collar 60 disposed in an appropriate counter-bore in the front face of the rear plate 57. The guide pin extends through the mounting plate in opposite directions with its axis parallel to the axes of the pins 51. Aligned through-bores 61 and 62 in the two material mold half 43 and the rotary mold block 40, respectively, are adapted to slidably receive the mold end 63 and the block end 64 of the guide pin 59.

In the mold closed position of FIG. 5, the core pins 51 are in the extended position with the end portions 52 thereof disposed in the first material-receiving mold cavity 45 the full depth of the recessed portion 47 in the face 44 of the two material mold half 43. In the extended position, the pin end portions 52 engage the face 26 of the first material mold half 24 and, as the first material is injected into the mold cavity 45, the end portions 52 block the receipt of the first material into the parts of the mold cavity which they occupy. Further, since the pin ends 52 extend completely through the mold cavity, the first injected material will be provided with a through core at the position of each pin end.

To hold the core pins in the extended position and prevent their displacement therefrom under the pressure of the first injected material, the block end 64 of the guide pin 59 extends through the bore 62 in the mold block 40 and engages the face 31 of the second material mold half 27. It will be appreciated that, if the mounting plate 54 is displaced in either direction within the recessed area 55 as the mold is closed (e.g. from the position of FIG. 4b to that of 4c), contact between mold face 31 and guide pin end 64 or core pin end portions 52 and mold face 26 will automatically move mounting plate 54 to the extended position where it will be held until the mold is reopened.

The end portions 52 of the core pins 51 are preferably tapered for the following reasons. The end portion 52 of each core pin 51 disposed in mold cavity 45 is preferably tapered to approximately one-half the depth of recessed portion 47. The tapers thus formed in the first material provide under cut areas for a more positive locking of the subsequently injected second material.

In the mold closed position in the upper portion of FIG. 5, the mold end 63 of the guide pin 59 extends through the bore 61 in the two material mold half 43 and into a blind hole 65 in the face 26 of the first material mold half 24. The distance by which the end 63 of guide pin 59 extends into the hold 65 is equal to the difference in the depth of recessed portion 47 and the length of the taper at the end portion 52 of the pin 51.

After injection of the first material, the mold is opened, as previously described, and the rotary block is rotated 180° on its shaft 41, carrying the two material mold half with the first material held therein to a position facing the second material mold half 27. As the mold is closed by bringing the second material mold half toward the two material mold half, initial contact takes place between the mold end 63 of the guide pin 59 and the face 31 of the second material mold half 27. Further closing movement causes the guide pin 59 to slide in bores 61 and 62, carrying with it the mounting plate 54 and core pins 51, such that, in the fully closed position with faces 31 and 44 in contact, the pins 51 are withdrawn from the extended position in the upper portion of FIG. 5 to a retracted position shown in the lower portion. In the retracted position, the end portions 52 of pins 51 are preferably withdrawn from the first material until the ends of the tapered portions of the pins 51 lie flush with the surface of the recessed portion 47 in the two material mold half 43. The second material is then injected into that part of the two material-receiving mold cavity 46 not occupied by the first material, namely, the recess 48 in the face of the second material mold half 27 and the cores in the first material left with retraction of the pins 51. The pin ends 52 must be maintained in this position within recessed portion 47 in order to prevent the flow of the second injected material beyond the two material-receiving mold cavity 46. Thus, to hold the pins 51 from further retraction under the injection pressure of the second material, either of two variations of abutment means may be used. The recessed area 55 in the mold block 40 and the mounting plate 54 may be dimensioned such that the bottom surface 66 of the former and the rear face 67 of the latter abut in the retracted position (FIG. 5, lower). Alternately, a blind hole 65' may be provided with a depth exactly equal to the distance through which the guide pin 59 moves from the extended to the retracted core pin positions, resulting in abutment of the block end 64 of the guide pin in the bottom of blind hole 65' in the mold closed retracted position (shown in the lower portion of FIG. 5).

Figure 7:
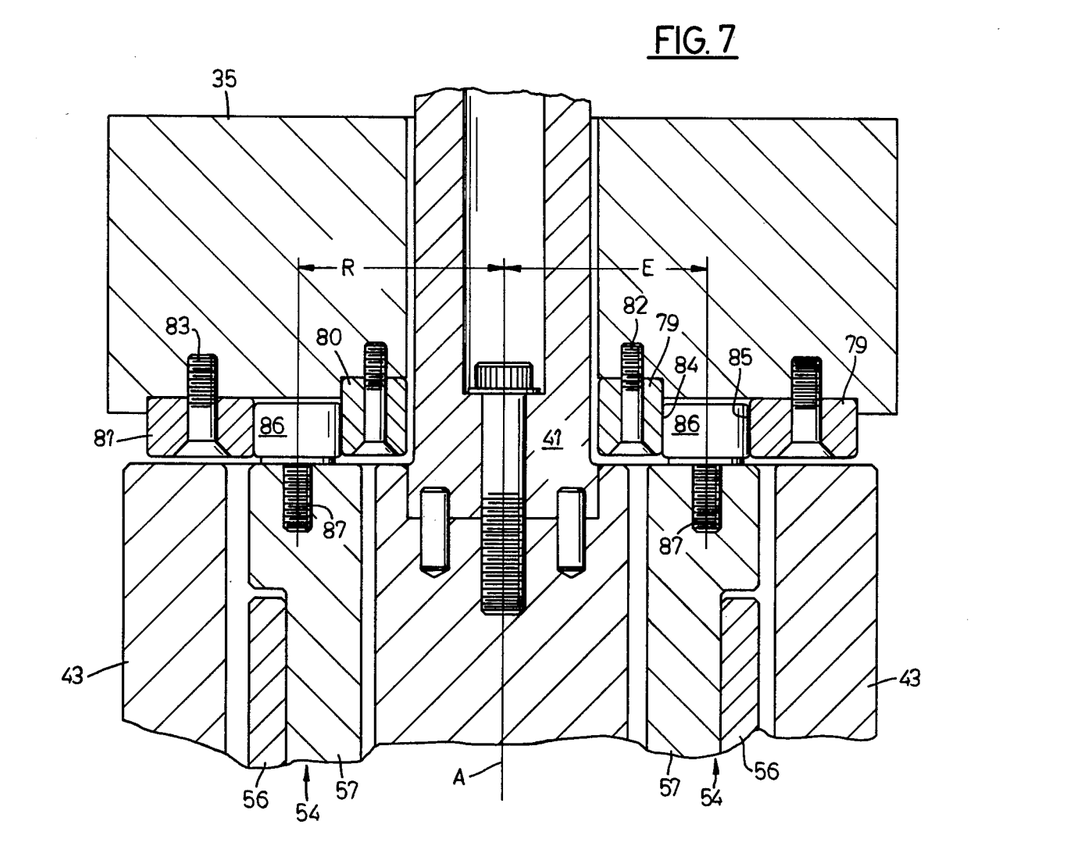
FIG. 7 is a partial horizontal section taken on line 7—7 of FIG. 6.

FIGS. 6 and 7 show the preferred embodiment of the invention wherein the rotary mold block 40 includes a pair of identical two material mold halves 43. The core pins 51 and certain other elements of the pin indexing mechanism are identical to elements already described with respect to the FIG. 5 embodiment and are, therefore, numbered the same. Disposed in the recessed area 55 in the mold block 40 behind each mold half 43 is a mounting plate 54, each comprising a front plate 56 and a rear plate 57, and having mounted therein a set of core pins 51.

Each mounting plate 54 has secured therein a set of four guide pins 68 (only two of each set being shown in FIG. 6), each having a mold end 69 slidably received in the through-bore 61 in the two material mold half 43 and a block end 70 slidably received in a through-bore 71 extending between the bottom surfaces 66 of the recessed areas 55 in the mold block 40. Each guide pin 68 in one of the mounting plates 54 is axially aligned with a corresponding guide pin 68 in the other mounting plate. In the mold closed position shown, the block ends 70 of each axially aligned pair of guide pins 68 abut one another, and the opposite mold ends 69 abut, respectively, a first shim 72 on the first material injection side and a second shim 73 on the second material injection side. The first and second shims 72 and 73 are preferably threaded into the faces of the first and second material mold halves 24 and 27, respectively, and are further provided with respective enlarged heads 74 and 75, each adapted to extend into the through-bore 61 in one of the two material mold halves 43 in the mold closed position. The thickness of the head 74 of the second shim 73 exceeds the thickness of the head 75 of the first shim 72 by an amount equal to the distance that the mounting plates 54 and attached pins 51 move from the extended position in the first material-receiving mold cavity 45 to the retracted position in the two material-receiving mold cavity 46. Thus, in the closed position, the combined lengths of each pair of axially aligned guide pins 68 and the thicknesses of the heads of the first and second shims 72 and 73 is equal to the distance between the faces 26 and 31 of the first and second material mold halves 24 and 27, respectively.

As the mold faces are brought to the closed position either from the positions of FIG. 4b to 4c or from the positions of FIG. 4d (with a further 90° rotation) to 4a, the guide pins 68 and shims 72 and 73 will automatically index the mounting plates 54 and core pins 51 simultaneously to the proper extended and retracted positions, in basically the same manner as previously described for the embodiment of FIG. 5. The abutting contact between the block ends 70 of the guide pins 68 and between their mold ends 69 and the respective shims 72 and 73 securely holds the mounting plates 54 against any movement while the molds are closed.

It has been found, however, that under high injection pressures, particularly those generated by the injection of lead, there may be a tendency for the two material mold halves 43 to deflect under load. As a result, the injected lead may "flash" or leak from the first material-receiving mold cavity 45 and run between the opposing mold faces 26 and 44. To prevent flashing, support pins 76 are slidably disposed in intermediate bores 77 in the mold block 40 and their ends 78 are adapted to abut the rear faces 67 of the mounting plates 54 in the mold closed position to support the mounting plates against deflection. Two support pins 76 are shown, however, more may be used if additional support is desired or necessary. Since the support pins 76 can slide in the intermediate bores 77, they are free to reciprocate within the rotary mold block 40 in response to the relative movements of the mounting plates 54 as they move from the extended to the retracted positions, or vice versa.

As a supplement to or completely in lieu of the pin indexing means already described for the embodiments of FIGS. 5 and 6, there is also shown in FIGS. 6 and 7 an indexing mechanism which operates solely in response to the rotary movement of mold block 40. A pair of annular cam rings 79 is attached to the inside surface of each support block 35 adjacent the opposite lateral surfaces of the rotary mold block 40 and surrounding the shaft 41. The cam rings 79 comprise an inner cam ring 80 and an outer cam ring 81, each attached to the support block 35 by a series of circumferentially spaced machine screws 82 and 83, respectively. The outer surface 84 of the inner cam ring 80 and the inner surface 85 of the outer cam ring 81 form an annular cam track about the shaft 41 upon which the mold block 40 rotates. A cam follower 86 is attached to the lateral surfaces of each mounting plate 54 and is journaled for rotation about its mounting 87. The diameter of each cam follower 86 is just slightly smaller than the width of the cam track formed by annular surfaces 84 and 85, such that the cam followers 86 will follow with a close tolerance the path defined by the cam track as the block 40 rotates. The annular surfaces 84 and 85 define eccentric portions in the cam track located substantially on a line through the axis A of the rotary mold block 40 and perpendicular to the faces of the first and second material mold halves 24 and 27 in the mold closed position, i.e. the line coincident with section line 7—7 in FIG. 6.

The eccentric portion of the cam track on the first material injection or right side of FIGS. 6 and 7 is dimensioned to cause the cam followers 86 and mounting plate 54 to which they are attached to automatically move to the extended position in response to the rotary movement of the mold block 40 about its axis A. In the extended position, the center of the cam followers 86 is disposed at a distance E from the axis A. Correspondingly, the diametrically opposite eccentric portion of the cam track on the second material injection or left side of FIGS. 6 and 7 causes simultaneous movement of the other cam followers 86 disposed at a distance R from the axis A. The eccentricity or amount by which the distance E exceeds the distance R is equal to the distance through which each mounting plate 54 and attached core pins 51 move from the extended to the retracted position.

Although the cam followers 86, operating within the close confines of the cam track surfaces 84 and 85, can independently establish and hold during injection the mounting plate and pin positions, this indexing mechanism operates more smoothly if guide pins, such as 59 of FIG. 5 or 68 of FIG. 6 are used as a supplement thereto. In this case the guide pins 59 or 68 may be used only to provide a guiding action or may additionally provide the support needed for high injection pressures.

The cam indexing mechanism can further provide other important operational benefits not attainable with the guide pin indexing mechanism alone. Referring to FIGS. 6 and 4d, as the rotary mold block 40 is rotating through the ejection position (FIG. 4d), the centrifugal force of rotation may tend to cause a radially outward movement of the mounting plates 54 and attached core pins 51. As will be explained below, such outward movement may be used advantageously to help effect ejection of the composite article 49 from the two material mold half 43 facing downwardly. However, a corresponding outward movement of the opposite upwardly facing mounting plate could cause further extension of the core pins 51 (beyond the extended position), resulting in premature dislodgement of the first injected material from the upwardly facing two material mold half 43. Cam followers 86 bearing on the inner surfaces 85 of outer cam rings 81 can be used to prevent such adverse movement.

To provide ejection of the composite molded article 49 in FIG. 4d, the core pins 51 with their end portions 52 disposed against the composite article within the two material-receiving mold cavity 46 in FIG. 6 are caused to move outwardly through the recessed portion 47 in the face of the two material mold half 43 (and preferably beyond the extended pin position) to positively force or eject the article 49. Most basically, ejection can be accomplished by allowing the mounting plate 54, under the combined influence of gravitational and centrifugal forces, to move toward its two material mold half 43. As may be seen in FIG. 6, there exists a substantial gap between the front face 88 of front plate 56 and the inner surface 89 of the two material mold half 43. Full, unrestricted movement of the mounting plate 54 through the gap is allowed by separation of the block ends 70 of the guide pins 68.

A smoother and better controlled ejection may be effected by utilizing the cam followers 86 and a specially shaped ejection portion in the surfaces 84 and 85 of the cam tracks. The cam track ejection portions 90 may comprise an area of greater eccentricity with respect to that provided for the extended position (represented by the distance E). Alternately, the ejection portions 90 may comprise a pronounced dip in each of the cam tracks or, if the rotary mold block 40 is stopped for ejection, interruptions in the cam tracks. In the latter situation, additional means for retracting the cam followers 86 from the interrupted portions of the cam tracks would have to be provided.

We claim:

1. In an apparatus for molding composite articles from two materials, including a stationary first material mold half; a second material mold half disposed spaced from and in parallel facing relation to said first material mold half and movable linearly toward and away therefrom; a mold block disposed between said first and second material mold halves, movable linearly in response to movement of said second material mold half and rotatable about an axis between first and second material mold halves and parallel to their faces; and, two material mold means attached to said mold block and adapted to form, respectively and in response to sequential linear movements of said second material mold half and said mold block and rotary movement of said mold block, a mold closed position including:

a. a first material-receiving mold cavity with the face of said two material mold means in contact with the face of said first material mold half; and,
   b. a two material-receiving mold cavity with the face of said two material mold means in contact with the face of said second material mold half; the improvement comprising:

(1) mold core means movably attached to said mold block and extending through said two material mold means generally perpendicular to its face;
   (2) said mold core means having:
      (a) an extended position with mold core end portions disposed within parts of said first material-receiving mold cavity to block the receipt of the first material into said parts; and,
      (b) a retracted position with said mold core end portions at least partially retracted from said extended position and disposed with said first material within said two material-receiving mold cavity to allow the receipt of the second material into said parts and into the remainder of said two material-receiving mold cavity; and,
   (3) indexing means on said mold block for moving said mold core means from said extended position to said retracted position in response to rotation of said mold block and linear movement of said second material mold half and said mold block to the mold closed position.

2. The apparatus as defined in claim 1 wherein said indexing means comprises:
   (1) a mounting plate for said mold core means disposed in said mold block behind said two material mold means; and,
   (2) means for slidably attaching said mounting plate to said mold block and said two material mold means and for moving said mounting plate and mold core means therebetween from said extended position to said retracted position.

3. The apparatus as defined in claim 2 wherein said means for attaching said mounting plate to said mold block and said two material mold means and for moving said mounting plate and mold core means from said extended to said retracted positions comprises:
   (1) a guide pin attached and secured against axial movement with respect to said mounting plate and disposed parallel to said mold core means;
   (2) said guide pin having ends extending through said mounting plate in opposite directions;
   (3) through-bores in said mold block and said two material mold means in axial alignment with said guide pin and adapted respectively to slidably receive one end of said guide pin; and,
   (4) abutment means on said first material mold half and said second material mold half, said abutment means aligned with said guide pin and adapted to engage the ends thereof in the mold closed position:
      (a) for establishing said extended position with the formation of said first material-receiving mold cavity; and,
      (b) for establishing said retracted position with the formation of said two material-receiving mold cavity.

4. The apparatus as defined in claim 3 wherein said abutment means comprises:

(1) a first shim attached to the face of said first material mold half, extending outwardly therefrom and adapted to be received in the bore in said two material mold means or in said mold block;
(2) a second shim attached to the face of said second material mold half, extending outwardly therefrom and adapted to be received in said mold block or in the bore in said two material mold means; and,
(3) said second shim having a thickness exceeding the thickness of said first shim by an amount equal to the distance said mounting plate and mold core means move from said extended to said retracted position.

5. The apparatus as defined in claim 4 wherein said two material mold means comprises:
(1) a pair of two material mold halves disposed on opposite sides of said mold block;
(2) a mounting plate for each two material mold half;
(3) at least two guide pins for each mounting plate;
(4) each guide pin in one of said mounting plates being in axial alignment with a corresponding guide pin in the other of said mounting plates;
(5) a through-bore in said mold block for receipt of the opposed ends of each pair of axially aligned guide pins; and,
(6) the combined lengths of each pair of aligned guide pins the thicknesses of said first and second shims being equal to the distance between the faces of said first and second material mold halves in the mold closed position.

6. The apparatus as defined in claim 5 including:
(1) support pins slidably mounted in said mold block between said mounting plates and disposed parallel to and offset from said guide pins;
(2) said support pins being movable an amount at least equal to the distance moved by one of said mounting plates between one of said extended or retracted positions and the other of said positions; and,
(3) said support pins each having opposite end surfaces adapted to abut the opposed faces of said mounting plates in the mold closed position.

7. The apparatus as defined in claim 1 including:
(1) a first material injection means operatively attached to said first material mold half for injecting said first material into said first material-receiving mold cavity; and,
(2) a second material injection means operatively attached to said second material mold half for injecting said second material into said two material-receiving mold cavity after injecting said first material.

8. The apparatus as defined in claim 7 wherein said first material is lead and said second material is plastic.

9. The apparatus as defined in claim 8 wherein:
(1) said first material injection means comprises a die casting injector; and,
(2) said second material injection means comprises a plastic injector.

10. The apparatus as defined in claim 2 wherein the rotary movement of said mold block is provided independently of the linear movement of said second material mold half and said mold block.

11. The apparatus as defined in claim 1 wherein said indexing means comprises:
(1) a mounting plate for said mold core means disposed in said mold block behind said two material mold means;
(2) means for slidably attaching said mounting plate to said mold block and said two material mold means and for providing movement of said mounting plate and mold core means therebetween from said extended position to said retracted position;
(3) support means mounting said mold block for rotation about its axis;
(4) a cam track in said support means generally surrounding the axis of said mold block;
(5) a cam follower attached to said mounting plate and in operative engagement with said cam track; and,
(6) said cam track having portions lying substantially on a line through the axis of said mold block and perpendicular to the faces of said first and second material mold halves, said portions establishing, respectively, the extended and retracted positions of said mold core means.

12. The apparatus as defined in claim 11 wherein said cam track defines a generally eccentric path around the axis of said mold block, with the distance from said axis of the portion of said cam track establishing the extended position of said mold core means being greater than the distance from said axis of the portion of said cam track establishing the retracted position of said mold core means.

13. The apparatus as defined in claim 2 wherein said two material mold means comprises:
(1) a pair of two material mold halves disposed on opposite sides of said mold block;
(2) one of said two material mold halves providing said first material-receiving mold cavity; and,
(3) the other of said two material mold halves simultaneously providing said two material-receiving mold cavity.

14. The apparatus as defined in claim 12 including article ejection means operatively attached to said mounting plate and adapted to further extend said mold core means beyond said extended position.

15. The apparatus as defined in claim 14 wherein said ejection means includes an ejection portion on said cam track lying between said portions establishing the retracted and extended positions of said mold core means in the direction of rotation of said mold block.

16. The apparatus as defined in claim 15 wherein said ejection portion defines the greatest eccentricity of said cam track with respect to the axis of said mold block.

17. The apparatus as defined in claim 1 wherein said mold core means comprise core pins which in said retracted position are fully retracted from said first material.

18. The apparatus as defined in claim 2 wherein said indexing means further comprises:
(1) a guide pin attached to and secured against axial movement with respect to said mounting plate and disposed parallel to said mold core means;
(2) said guide pin having ends extending through said mounting plate in opposite directions;
(3) aligned bores in said mold block and said two material mold means, said bores disposed in axial alignment with said guide pin and each adapted to slidably receive one end of said guide pin;
(4) the bore in said mold block extending therethrough and having open communication with the face of said second material mold half in the mold closed position; and,
(5) the end of said guide pin disposed in the bore in said mold block and the ends of said mold core means adapted to engage, respectively, the face of said second material mold half and the face of said first material mold half for establishing said extended position with the formation of said first material-receiving mold cavity.

19. The apparatus as defined in claim 18 comprising:
(1) the bore in said two material mold means extending therethrough and having open communication with:
 (a) the face of said first material mold half in said extended position; and,
 (b) the face of said second material mold half in said retracted position;
(2) a recess in the face of said first material mold half aligned with and adapted to slidably receive the end of said guide pin disposed in the bore in said two material mold means; and,
(3) said guide pin having a length exceeding the distance between the faces of said first and second material mold halves in the mold closed position by an amount equal to the distance said mounting plate and mold core means move from said extended to said retracted position.

20. The apparatus as defined in claim 19 wherein the end of said guide pin disposed in the bore in said two material mold means engages the bottom of said recess in the mold closed position forming said first material-receiving mold cavity.

* * * * *